(12) United States Patent
Baluch et al.

(10) Patent No.: US 10,769,832 B1
(45) Date of Patent: Sep. 8, 2020

(54) SYSTEM AND METHOD OF UTILIZING A USER INTERFACE WITH MULTIPLE PSEUDO LIGHT SOURCES

(71) Applicant: Dell Products L.P., Round Rock, TX (US)

(72) Inventors: Greg J. Baluch, Austin, TX (US); Erik Peter Summa, Austin, TX (US); John S. Pruitt, Cedar Park, TX (US); Jonathan Lance Rea, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/373,265

(22) Filed: Apr. 2, 2019

(51) Int. Cl.
| G06T 11/60 | (2006.01) |
| G06T 7/90 | (2017.01) |
| G06T 11/00 | (2006.01) |
| G06F 9/451 | (2018.01) |
| H04N 1/60 | (2006.01) |
| G09G 5/00 | (2006.01) |

(52) U.S. Cl.
CPC .............. *G06T 11/60* (2013.01); *G06F 9/451* (2018.02); *G06T 7/90* (2017.01); *G06T 11/001* (2013.01); *G06T 2200/24* (2013.01); *G06T 2207/10024* (2013.01)

(58) Field of Classification Search
CPC combination set(s) only.
See application file for complete search history.

(56) References Cited

U.S. PATENT DOCUMENTS

| 10,540,812 | B1 * | 1/2020 | Yildiz ..................... G06T 19/20 |
| 2008/0315785 | A1 * | 12/2008 | Price .................... H05B 41/282 315/277 |
| 2018/0007247 | A1 * | 1/2018 | Aggarwal ................ F21S 11/00 |
| 2018/0211608 | A1 * | 7/2018 | Reddy .................. G09G 3/3406 |

\* cited by examiner

*Primary Examiner* — Wesner Sajous
(74) *Attorney, Agent, or Firm* — Baker Botts L.L.P.

(57) ABSTRACT

In one or more embodiments, one or more systems, methods, and/or processes may display, via a graphical user interface, a graphic; and for each time value in ordered multiple time values: may determine, based at least on the time value of the ordered multiple time values, first multiple light intensity values of respective first multiple pseudo light sources at respective first multiple positions with respect to the graphical user interface and associated with a first clipping path of the graphic; for each pixel of first multiple within the first clipping path of the graphic, may determine a lightness value for the pixel of the first multiple pixels based at least on non-linear relationships of distances between the pixel of the first multiple pixels and each of the first multiple positions; and may display, via the graphical user interface, the first multiple pixels within the first clipping path of the graphic.

19 Claims, 12 Drawing Sheets

FIG. 2D  FIG. 2E

SYSTEM AND METHOD OF UTILIZING A USER INTERFACE WITH MULTIPLE PSEUDO LIGHT SOURCES

BACKGROUND

Field of the Disclosure

This disclosure relates generally to information handling systems and more particularly to user interfaces that utilize pseudo light sources.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may display, via a display, a graphical user interface; may display, via the graphical user interface, a graphic; and for each time value in ordered multiple time values: may determine, based at least on the time value of the ordered multiple time values, first multiple light intensity values of respective first multiple pseudo light sources at respective first multiple positions with respect to the graphical user interface and associated with a first clipping path of the graphic; for each pixel of first multiple pixels within the first clipping path of the graphic, may determine a lightness value for the pixel of the first multiple pixels based at least on non-linear relationships of distances between the pixel of the first multiple pixels and each of the first multiple positions; may display, via the graphical user interface, the first multiple pixels within the first clipping path of the graphic; may determine, based at least on the time value of the ordered multiple time values, second multiple light intensity values of second first multiple pseudo light sources at respective second multiple positions with respect to the graphical user interface and associated with a second clipping path of the graphic; for each pixel of second multiple pixels within the second clipping path of the graphic, may determine a lightness value for the pixel of the second multiple pixels based at least on non-linear relationships of distances between the pixel of the second multiple pixels and each of the second multiple positions; and may display, via the graphical user interface, the second multiple pixels within the second clipping path of the graphic.

In one or more embodiments, the first multiple pseudo light sources may be associated with respective multiple different colors. In one or more embodiments, the first multiple pseudo light sources may include at least one pseudo light source of the second multiple pseudo light sources. In one or more embodiments, the graphic may include at least one portion that is static. In one or more embodiments, the non-linear relationships of distances between the pixel of the first multiple pixels and each of the first multiple positions may be based at least on an inverse square relationship.

In one or more embodiments, at least a first two or more of the first multiple pixels may be at a first distance from a first pseudo light source of the first multiple pseudo light sources and may be associated with a hue value, a saturation value, and a first lightness value; and at least a second two or more of the first plurality of pixels may be at a second distance from the first pseudo light source of the first multiple pseudo light sources and may be associated with the hue value, the saturation value, and a second lightness value. For example, the second distance may be greater than the first distance. For instance, the second lightness value may be less than the first lightness value.

In one or more embodiments, the one or more systems, methods, and/or systems may further display, via the graphical user interface, a background graphic; and for each time value in the ordered multiple time values: may further determine, based at least on the time value of the ordered multiple time values, third multiple light intensity values of a respective third multiple pseudo light sources at respective third multiple positions with respect to the graphical user interface and associated with the background graphic; for each pixel of third multiple pixels of the background graphic, may further determine a lightness value for the pixel of the third multiple pixels based at least on non-linear relationships of distances between the pixel of the third multiple pixels and each of the third multiple positions; and may further display, via the graphical user interface, the third multiple pixels of the background graphic.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIGS. 2D and 2E illustrate examples of illuminated graphic areas, according to one or more embodiments;

DETAILED DESCRIPTION

Figure 1A:
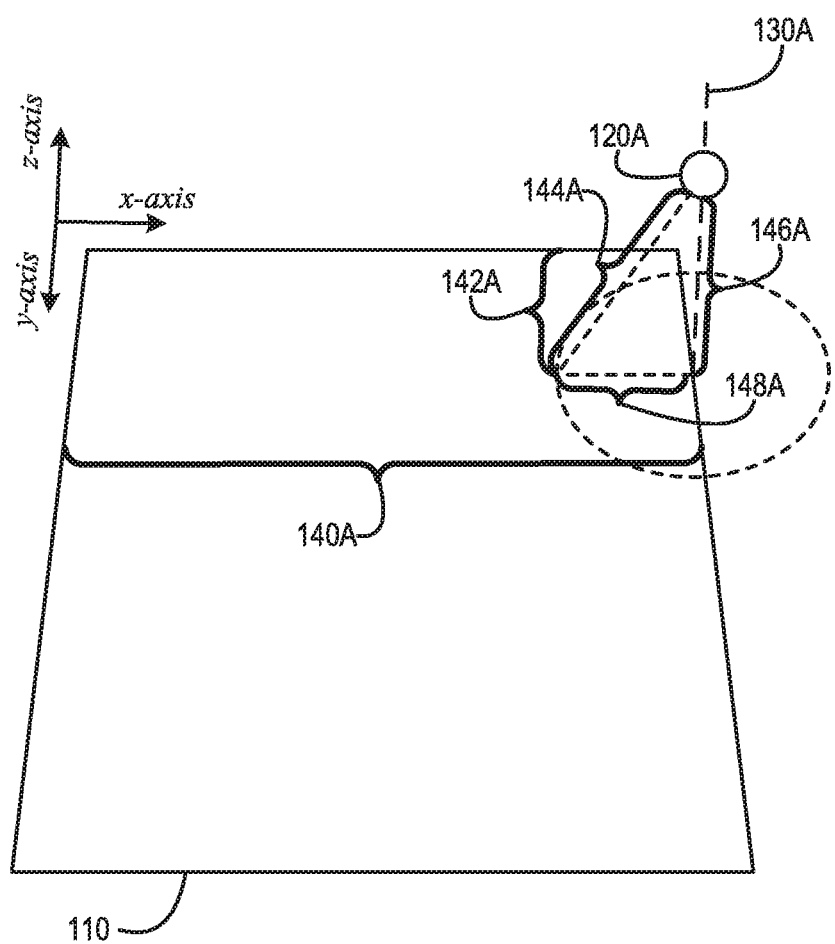
FIG. 1A illustrates an example of a pseudo light source and a graphical user interface, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a graphical user interface may include a visual polish. In one or more embodiments, a graphical user interface may include one or more animations. For example, an animation may include a video file. For instance, the animation may include looping the video file. In one or more embodiments, a background of a graphical user interface may include an animation. For example, the background of the graphical user interface may include a looped video file. For instance, the looped video file may provide the background of the graphical user interface a feeling of motion and/or an illusion of motion, among others.

In one or more embodiments, a video file that may be included in an animation may include a large file size. For example, the video file may include the large file size to provide a feeling of motion and/or an illusion of motion, among others. In one instance, the motion may be subtle, which may depend upon numerous small changes of graphics included in the video file. In another instance, the motion may depend upon one or more high resolutions. In one or more embodiments, an effectiveness of the video file may depend upon the one or more high resolutions. For example, the one or more high resolutions of the video file may aid and/or assist in providing subtle motions. In one or more embodiments, the one or more high resolutions may be utilized to avoid pixilation.

In one or more embodiments, a size of an application may be associated with one or more graphical user interface animations. In one example, the application may be or include a web application. In another example, the application may be or include a native application (e.g., an application executable by at least one processor of an information handling system, an application executable by at least one processor of a virtual machine, etc.). In one or more embodiments, the one or more graphical user interface animations may be associated with one or more storage sizes (e.g., sizes in bytes) that are much larger than an executable code storage size (e.g., a size in bytes) of the application and/or a storage size (e.g., a size in bytes) of a static image of the application.

In one or more embodiments, a video file that may be included in an animation may utilize a compression process in an attempt to reduce a storage size (e.g., a size in bytes) of the video file. For example, the compression process may introduce one or more of banding, color loss, and/or a Moire pattern, among others, into a presentation of video of the video file. For instance, introducing the one or more of the banding (e.g., a step effect), the color loss, and/or the Moire pattern, among others, into the presentation of video of the video file may not be desirable and/or may not be acceptable to a user of a graphical user interface.

In one or more embodiments, the one or more graphical user interface animations may not be initially included in an application. For example, the one or more graphical user interface animations may be downloaded (e.g., downloaded via a network) via an on-demand fashion. In one or more embodiments, providing the one or more graphical user interface animations for on-demand utilization may increase one or more complexities of the application. In one or more embodiments, providing the one or more graphical user interface animations for on-demand utilization may increase a number of information handling systems that are utilized to implement the on-demand utilization. For example, additional information handling systems may be utilized to store and/or host the one or more graphical user interface animations for on-demand utilization. In one instance, this may increase network utilization. In another instance, this may increase power utilization (e.g., an increase a number of information handling systems in an implementation may increase power utilization).

In one or more embodiments, an effect of motion may be provided via performing a method with ordered multiple time values and one or more pseudo light sources. In one example, a portion of a graphic may appear to move via performing the method with ordered multiple time values and one or more pseudo light sources. For instance, a portion of a graphic within clipping path may appear to move. In another example, a background of graphic may appear to move via performing the method with ordered multiple time values and one or more pseudo light sources.

Turning now to FIG. 1A, an example of a pseudo light source and a graphical user interface is illustrated, according to one or more embodiments. As shown, a pseudo light source 120A may be above a graphical user interface (GUI) 110. In one or more embodiments, a pseudo light source 120 may travel along an axis 130. For example, pseudo light source 120A may travel along an axis 130A. As illustrated, pseudo light source 120A may above GUI 110 by a distance 146A. As shown, axis 130A may be on an edge of GUI 110. In one example, axis 130A may be at a coordinate 140A with respect to an x-axis of GUI 110. In another example, axis 130A may be at a coordinate 142A with respect to a y-axis of GUI 110. In one or more embodiments, pseudo light source 120 may effectively radiate light. For example, pseudo light source 120 may be an isotropic radiator. In one instance, a lightness value associated with a pixel may be determined based at least on effectively radiated light from pseudo light source 120. In another instance, a lightness value associated with a pixel may be determined based at least on a distance between the pixel and a position of light source 120.

In one or more embodiments, light intensities along a radius 148 may be equal. For example, light intensities along a radius 148A may be equal. For instance, light intensities of pixels of GUI 110 along radius 148A may be equal. In one or more embodiments, as radius 148 increases, light intensities may decrease. For example, as radius 148 increases, light intensities may decrease in a non-linear fashion. For instance, light intensities of pixels of GUI 110 may be proportional to an inverse square of radius 148. In one or more embodiments, as a radius 144 increases, light intensities may decrease. For example, as radius 144 increases, light intensities may decrease in a non-linear fashion. For instance, light intensities of pixels of GUI 110 may be proportional to an inverse square of radius 144A.

Figure 1B:
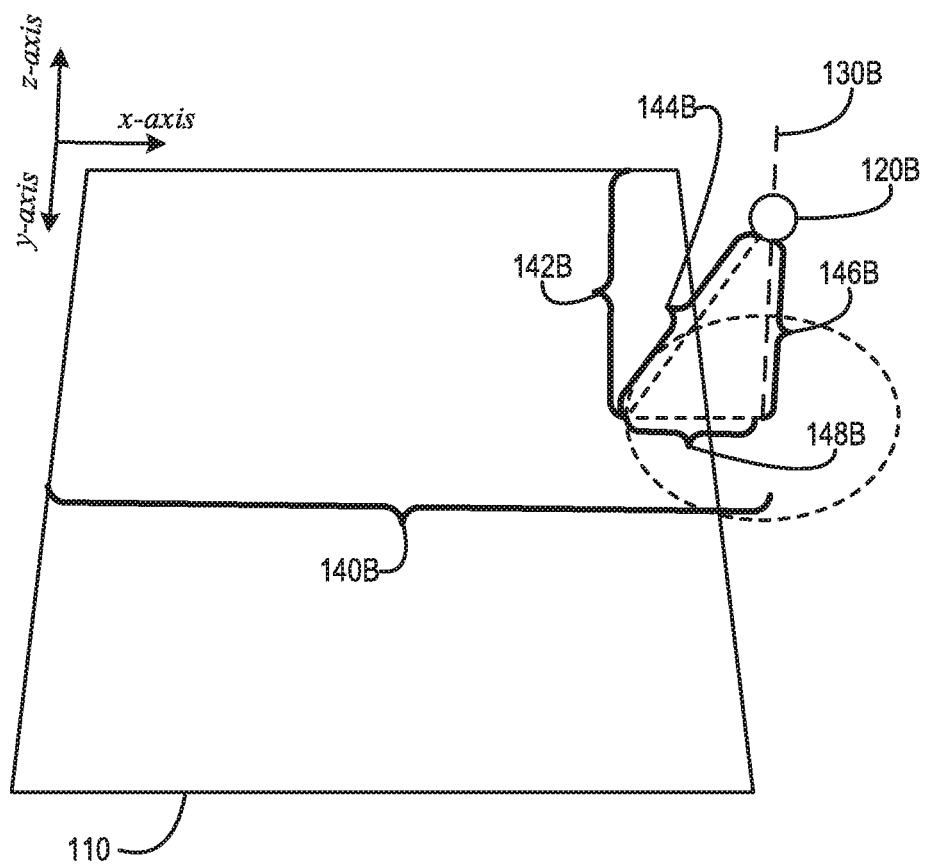
FIG. 1B illustrates a second example of a pseudo light source and a graphical user interface, according to one or more embodiments.

Turning now to FIG. 1B, a second example of a pseudo light source and a graphical user interface is illustrated, according to one or more embodiments. As shown, a pseudo light source 120B may be above GUI 110. For example, pseudo light source 120B may travel along an axis 130B. As illustrated, pseudo light source 120B may above GUI 110 by a distance 146B. As shown, axis 130B may be outside GUI 110. In one example, axis 130B may be at a coordinate 140B with respect to an x-axis of GUI 110. In another example, axis 130B may be at a coordinate 142B with respect to a y-axis of GUI 110.

In one or more embodiments, light intensities along a radius 148 may be equal. For example, light intensities along a radius 148B may be equal. For instance, light intensities of pixels of GUI 110 along radius 148B may be equal. In one or more embodiments, as radius 148 increases, light intensities may decrease. For example, as radius 148 increases, light intensities may decrease in a non-linear fashion. For instance, light intensities of pixels of GUI 110 may be proportional to an inverse square of radius 148. In one or more embodiments, as a radius 144 increases, light intensities may decrease. For example, as radius 144 increases, light intensities may decrease in a non-linear fashion. For instance, light intensities of pixels of GUI 110 may be proportional to an inverse square of radius 144B.

Figure 1C:
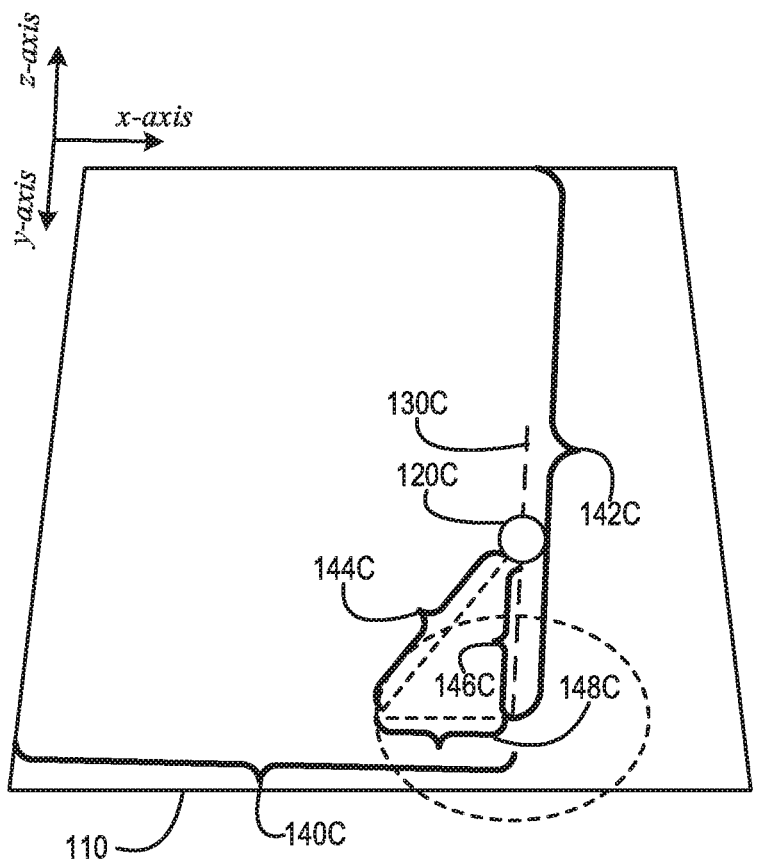
FIG. 1C illustrates another example of a pseudo light source and a graphical user interface, according to one or more embodiments.

Turning now to FIG. 1C, another example of a pseudo light source and a graphical user interface is illustrated, according to one or more embodiments. As shown, a pseudo light source 120C may be above GUI 110. For example, pseudo light source 120C may travel along an axis 130C. As illustrated, pseudo light source 120C may above GUI 110 by a distance 146C. As shown, axis 130C may be within GUI 110. In one example, axis 130C may be at a coordinate 140C with respect to an x-axis of GUI 110. In another example, axis 130C may be at a coordinate 142C with respect to a y-axis of GUI 110.

In one or more embodiments, light intensities along a radius 148 may be equal. For example, light intensities along a radius 148C may be equal. For instance, light intensities of pixels of GUI 110 along radius 148C may be equal. In one or more embodiments, as radius 148 increases, light intensities may decrease. For example, as radius 148 increases, light intensities may decrease in a non-linear fashion. For instance, light intensities of pixels of GUI 110 may be proportional to an inverse square of radius 148. In one or more embodiments, as a radius 144 increases, light intensities may decrease. For example, as radius 144 increases, light intensities may decrease in a non-linear fashion. For instance, light intensities of pixels of GUI 110 may be proportional to an inverse square of radius 144C.

Figure 1D:
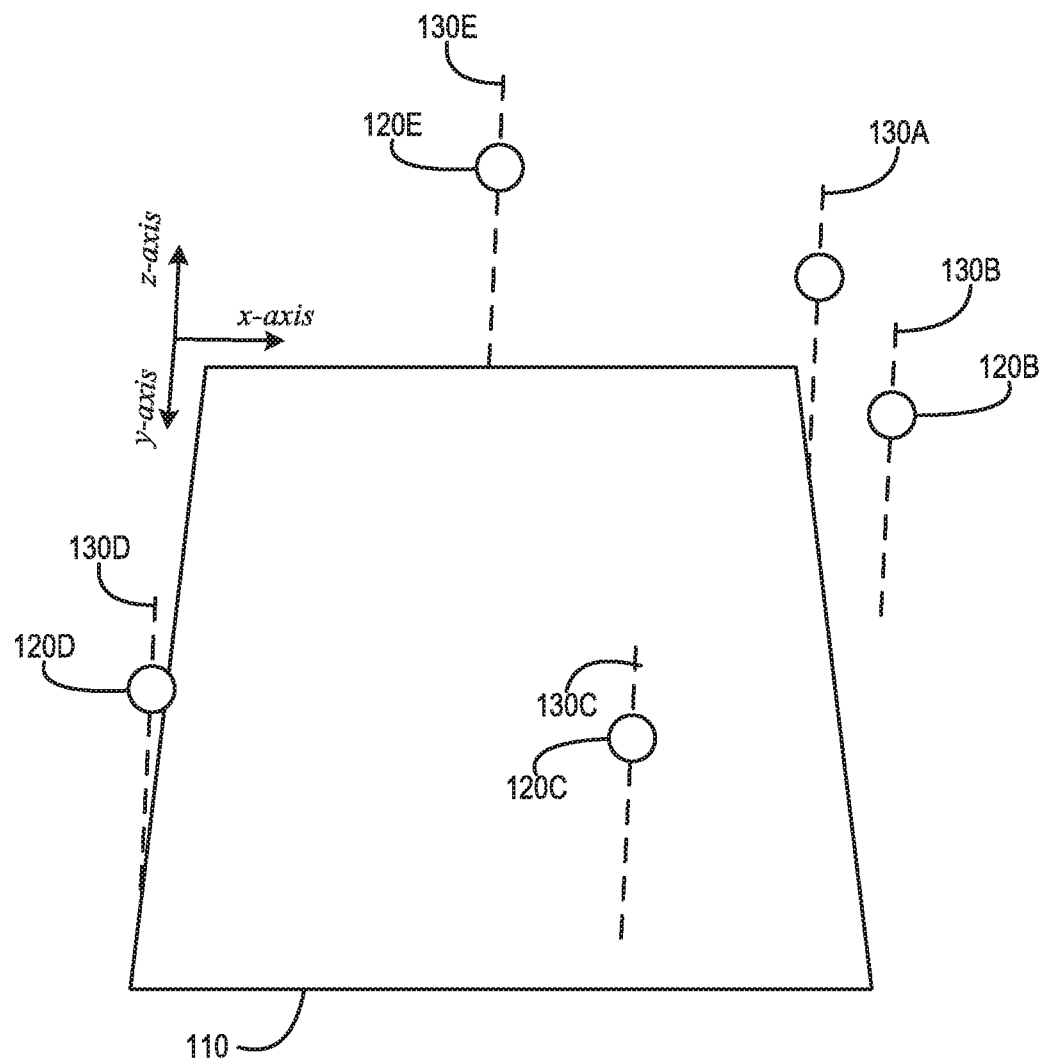
FIG. 1D illustrates an example of multiple pseudo light sources and a graphical user interface, according to one or more embodiments.

Turning now to FIG. 1D, an example of multiple pseudo light sources and a graphical user interface is illustrated, according to one or more embodiments. As shown, pseudo light sources 120A-120E may be at various locations with respect to GUI 120. In one or more embodiments, pseudo light sources 120A-120E may travel along their respective axes 130A-130E. In one or more embodiments, a pseudo light source 120 may not travel along an axis. For example, pseudo light sources 120A-120E may not travel along their respective axes 130A-130E. In one instance, a pseudo light source 120 may be fixed at a position above GUI 110. In another example, a pseudo light source 120 may be in a plane that includes all sides of GUI 110.

In one or more embodiments, if pseudo light source 120 is fixed at a position, an intensity of pseudo light source 120 may be varied. In one example, pseudo light source 120 may distribute light at a first intensity at a first time. For instance, pseudo light source 120 may distribute light at a first intensity for a first amount of time, starting at a first time. In another example, pseudo light source 120 may distribute light at a second intensity at a second time. For instance, pseudo light source 120 may distribute light at a second intensity for a second amount of time, starting at a second time. In one or more embodiments, an intensity of pseudo light source 120 may be varied with respect to time. For example, an intensity of pseudo light source 120 may be varied with respect to time transpiring. For instance, an intensity of pseudo light source 120 may be varied as a function of time. In one or more embodiments, an intensity of pseudo light source 120 may be varied as a function of time over multiple time values. For example, the multiple time values may be or include a sequence of time values. For instance, the sequence of time values may be repeated one or more times.

Figure 2A:
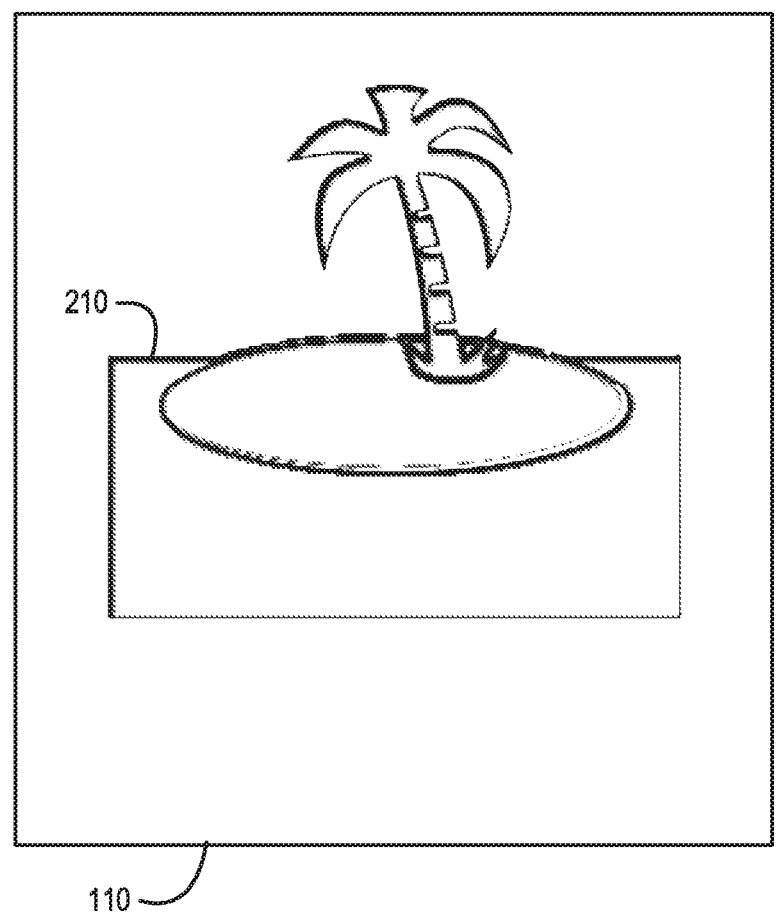
FIG. 2A illustrates an example of a graphical user interface displaying a graphic, according to one or more embodiments.

Turning now to FIG. 2A, an example of a graphical user interface displaying a graphic is illustrated, according to one or more embodiments. As shown, GUI 110 may display a graphic 210. In one or more embodiments, a graphic may include a clipping path. For example, a clipping path may be or include a closed vector path or shape. In one instance, anything inside the clipping path may be applied to an output. In another instance, anything outside the clipping path may be omitted from an output.

Figure 2B:
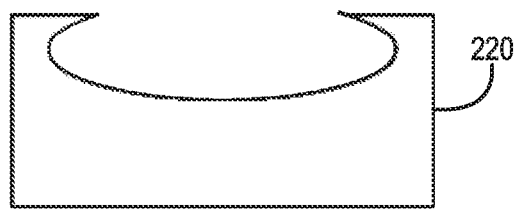
FIGS. 2B and 2C illustrate examples of clipping paths, according to one or more embodiments.
Figure 2C:
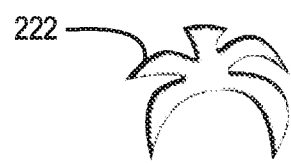

Turning now to FIGS. 2B and 2C, examples of clipping paths are illustrated, according to one or more embodiments. In one example, a clipping path 220 is shown in FIG. 2B. In another example, a clipping path 222 is shown in FIG. 2C.

Turning now to FIGS. 2D and 2E, examples of illuminated graphic areas are illustrated, according to one or more embodiments. In one example, a hashing area 230, shown in FIG. 2D, may display illuminations from one or more pseudo light sources 120. In another example, a hashing area 232, shown in FIG. 2E, may display illuminations from one or more pseudo light sources 120.

Figure 2F:
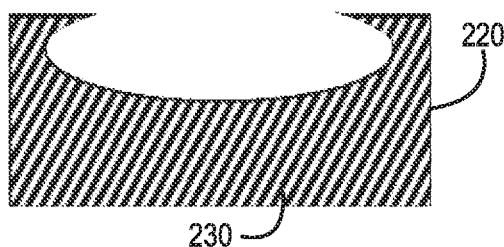
FIG. 2F illustrates an example of a graphical user interface displaying a graphic with clipping areas, according to one or more embodiments.
Figure 2F:
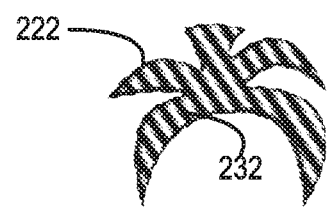
Figure 2F:
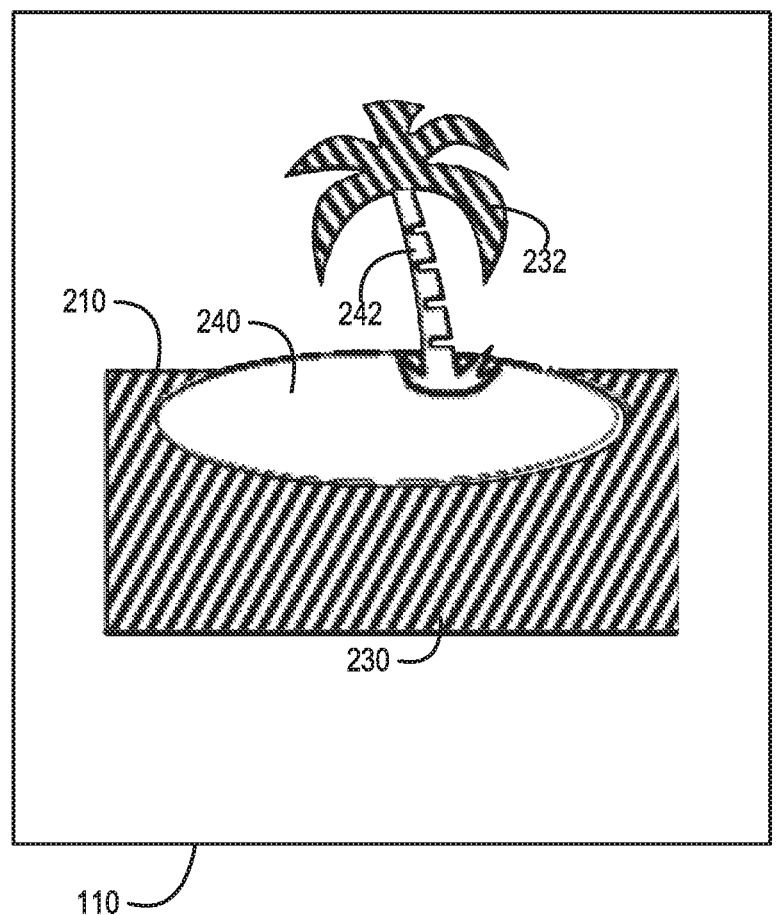

Turning now to FIG. 2F, an example of a graphical user interface displaying a graphic with clipping areas is illustrated, according to one or more embodiments. As shown, graphic 210 may display illuminations from one or more pseudo light sources 120 via hashing 230. As illustrated, graphic 210 may display illuminations from one or more pseudo light sources 120 via hashing 232.

In one or more embodiments, one or more portions of graphic 210 may not display illuminations from one or more pseudo light sources 120. In one example, a portion 240 of graphic 210 may not display illuminations from one or more pseudo light sources 120. For instance, portion 240 may be static. In another example, a portion 242 of graphic 210 may not display illuminations from one or more pseudo light sources 120. For instance, portion 242 may be static. In one or more embodiments, a portion of a graphic that is static may be indifferent to an affect from a pseudo light source. For example, a portion of a graphic that is static may not be affected by a pseudo light source.

Figure 2G:
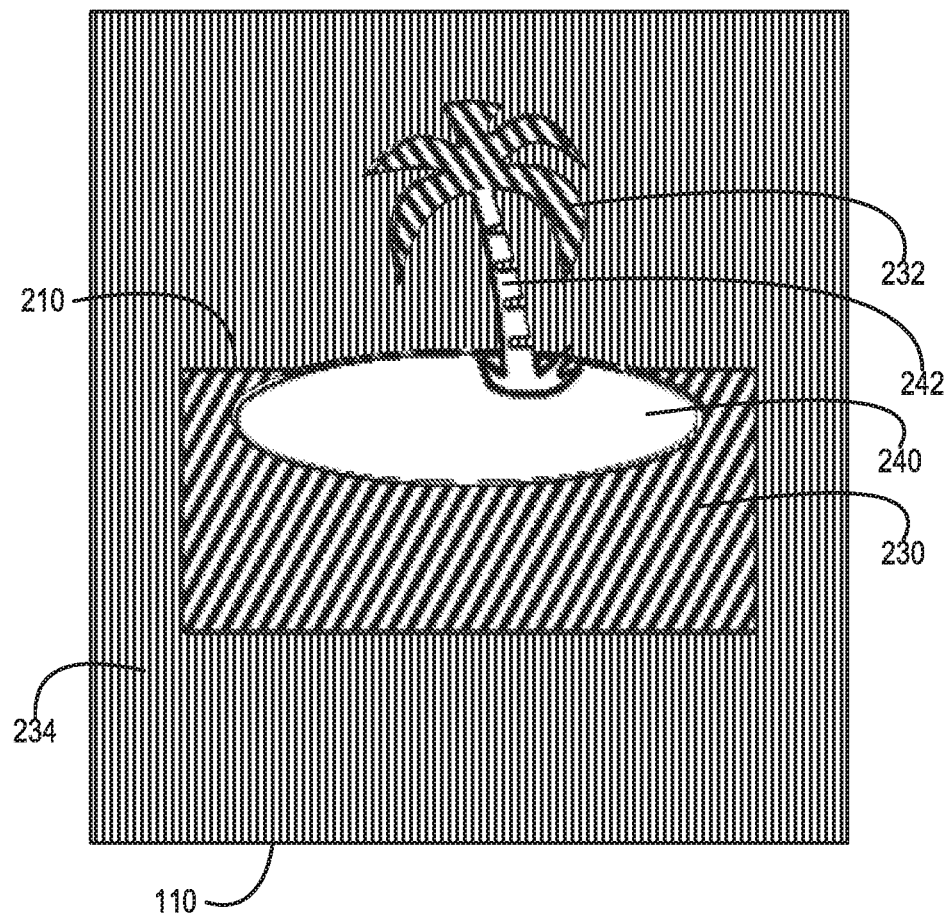
FIG. 2G illustrates an example of a graphical user interface displaying a background and a graphic with clipping areas, according to one or more embodiments.

Turning now to FIG. 2G, an example of a graphical user interface displaying a background and a graphic with clipping areas is illustrated, according to one or more embodiments. As shown, a hashing area 234 may display illuminations from one or more pseudo light sources 120. In one or more embodiments, hashing area 250 may be or include a background of GUI 110.

In one or more embodiments, hashing areas 230-234 may display illuminations from different one or more pseudo light sources 120. For example, a first hashing area of hashing areas 230-234 may not have a pseudo light source 120 in common with a second hashing area of hashing areas 230-234. In one or more embodiments, hashing areas 230-234 may display illuminations from one or more pseudo light sources 120. For example, a first hashing area of hashing areas 230-234 may have at least one pseudo light source 120 in common with a second hashing area of hashing areas 230-234.

In one or more embodiments, hashing areas 230-234 may display illuminations from one or more pseudo light sources 120 and may display illuminations from different one or more pseudo light sources 120. For example, a first hashing area of hashing areas 230-234 may have a first pseudo light source 120 in common with a second hashing area of hashing areas 230-234, and the first hashing area may have at least one pseudo light source 120 that is not in common with the second hashing area.

Figure 2H:
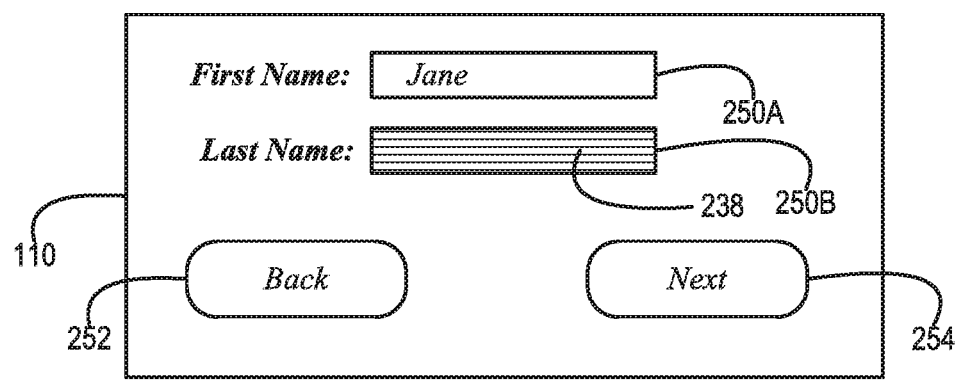
FIG. 2H illustrates an example of a graphical user interface displaying input areas, according to one or more embodiments.

Turning now to FIG. 2H, an example of a graphical user interface displaying input areas is illustrated, according to one or more embodiments. As shown, GUI 110 may display input areas 250A and 250B. As illustrated, input area 250A may be filled with text. As shown, input area 250B may yet be filled with text. As shown, in one or more embodiments, multiple pixels of input area 250B may be displayed. For example, the multiple pixels of input area 250B may be displayed via hashing 238. For instance, while hashing 238 illustrates stripes, displaying the multiple pixels of input area 250B may not include displaying stripes, banding, and/or a Moire pattern. The stripes of hashing 238 are to illustrate where the multiple pixels of input area 250B may be displayed. In one or more embodiments, the multiple pixels of input area 250B may display effects from one or more of pseudo light sources 120A-120E. In one example, input area 250B may include a clipping path. In another example, hashing 238 may represent a background of input area 250B. For instance, the background of input area 250B may display effects from one or more of pseudo light sources 120A-120E. In one or more embodiments, the effects from one or more of pseudo light sources 120A-120E may be utilized to draw attention of a user to input area 250B.

Figure 2I:
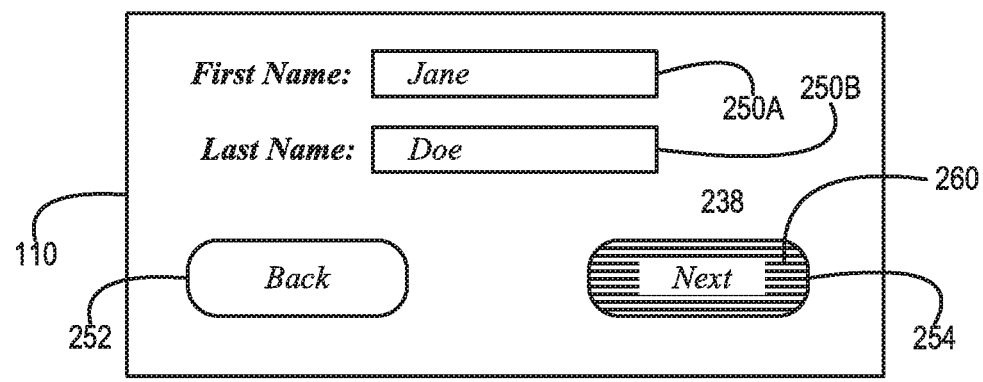
FIG. 2I illustrates an example of a graphical user interface displaying icons, according to one or more embodiments.

Turning now to FIG. 2I, an example of a graphical user interface displaying icons is illustrated, according to one or more embodiments. As shown, GUI 110 may display icons 252 and 254. In one or more embodiments, icons 252 and 254 may be or include GUI buttons. In one example, icon 252 may be selected and/or actuated to go "Back". In another example, icon 254 may be selected and/or actuated to proceed "Next". In one or more embodiments, multiple pixels of icon 254 may be displayed. For example, the multiple pixels of icon 254 may be displayed via hashing 260. For instance, while hashing 260 illustrates stripes, displaying the multiple pixels of icon 254 may not include displaying stripes, banding, and/or a Moire pattern. The stripes of hashing 260 are to illustrate where the multiple pixels of icon 254 may be displayed. In one or more embodiments, the multiple pixels of icon 254 may display effects from one or more of pseudo light sources 120A-120E. In one example, icon 254 may include a clipping path. In another example, hashing 260 may represent a background of icon 254. For instance, the background of icon 254 may display effects from one or more of pseudo light sources 120A-120E. In one or more embodiments, the effects from one or more of pseudo light sources 120A-120E may be utilized to draw attention of a user to icon 254.

Figure 2J:
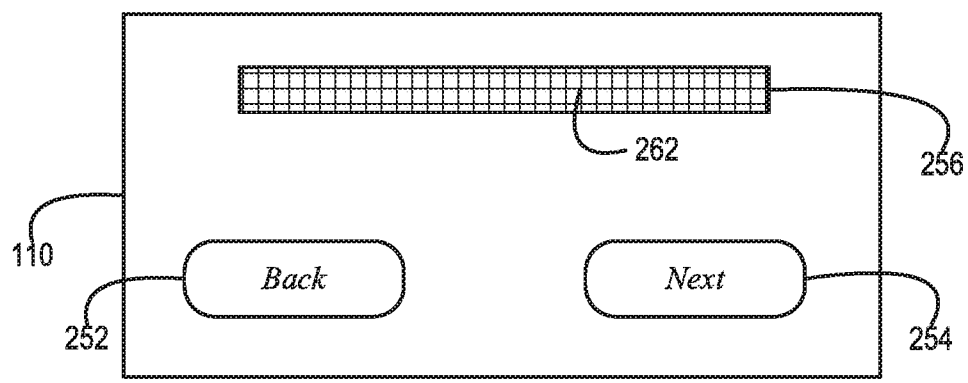
FIG. 2J illustrates an example of a graphical user interface displaying a progress bar, according to one or more embodiments.

Turning now to FIG. 2J, an example of a graphical user interface displaying a progress bar is illustrated, according to one or more embodiments. As shown, GUI 110 may display a progress bar 256. In one or more embodiments, multiple pixels of progress bar 256 may be displayed. For example, the multiple pixels of progress bar 256 may be displayed via hashing 262. For instance, while hashing 262 illustrates cross hashes, displaying the multiple pixels of progress bar 256 may not include displaying cross hashes, stripes, banding, and/or a Moire pattern. The cross hashes of hashing 262 are to illustrate where the multiple pixels of progress bar 256 may be displayed. In one or more embodiments, the multiple pixels of progress bar 256 may display effects from one or more of pseudo light sources 120A-120E. In one example, progress bar 256 may include a clipping path. In another example, hashing 262 may represent a background of progress bar 256. For instance, the background of progress bar 256 may display effects from one or more of pseudo light sources 120A-120E. In one or more embodiments, the effects from one or more of pseudo light sources 120A-120E may be utilized to draw attention of a user to progress bar 256. In one or more embodiments, the effects from one or more of pseudo light sources 120A-120E may be utilized (e.g., via progress bar 256) to indicate that a process is in progress.

Figure 2K:
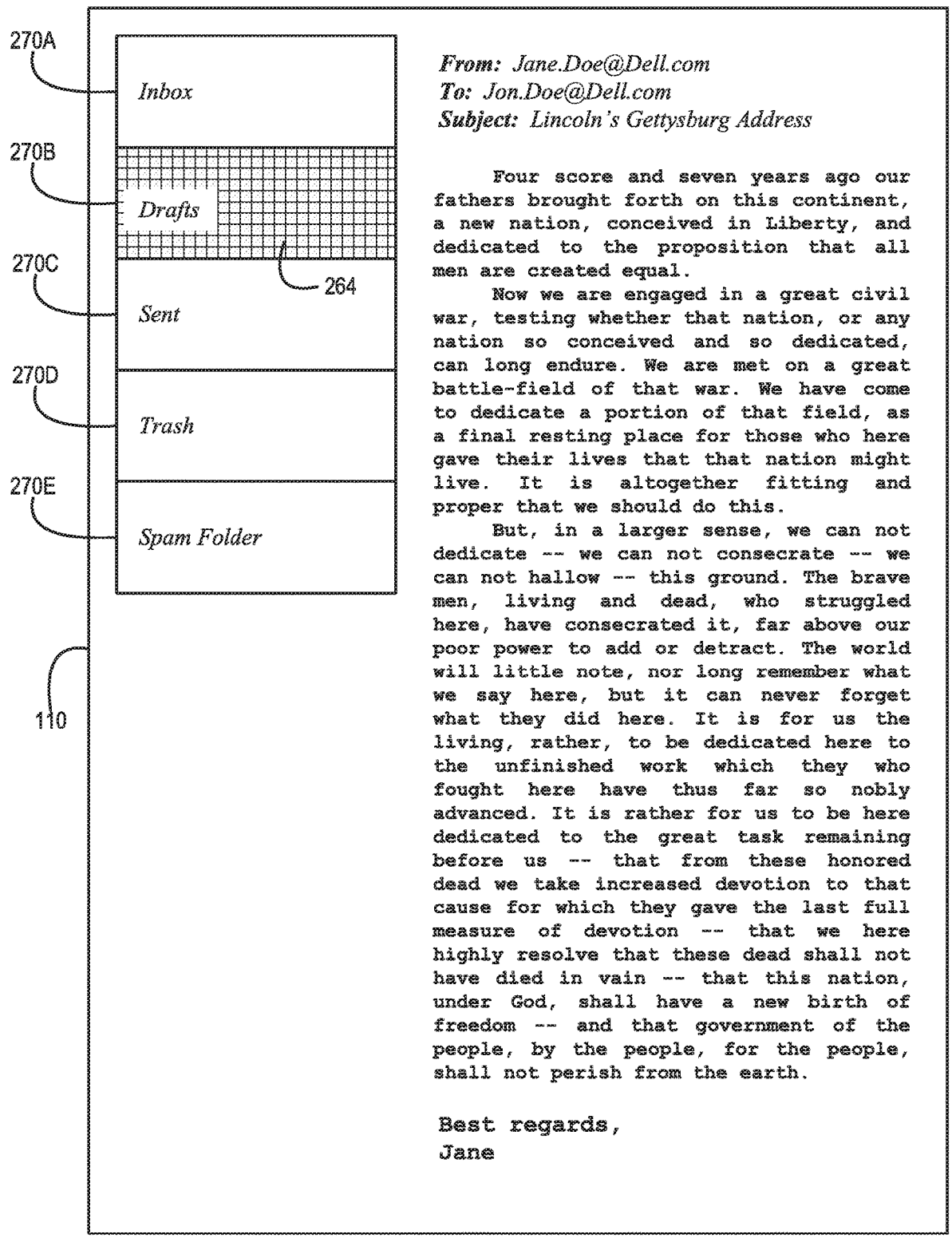
FIG. 2K illustrates an example of a graphical user interface displaying a selection, according to one or more embodiments.

Turning now to FIG. 2K, an example of a graphical user interface displaying a selection is illustrated, according to one or more embodiments. As shown, GUI 110 may display selection options 270A-270E. In one or more embodiments, a selection option of selection options 270A-270E may be selected and/or actuated. In one or more embodiments, selection options 270A-270E may be respectively associated with an inbox folder, a draft email folder, a sent email folder, a trash email folder, and a spam email folder of an email application. As illustrated, selection option 270B may be selected. For example, GUI 110 may display a draft of an email. For instance, GUI 110 may display a draft of an email in response to selection option 270B having been selected.

In one or more embodiments, multiple pixels of selection option 270B may be displayed. For example, the multiple pixels of selection option 270B may be displayed via hashing 264. For instance, while hashing 264 illustrates cross hashes, displaying the multiple pixels of selection option 270B may not include displaying cross hashes, stripes, banding, and/or a Moire pattern. The cross hashes of hashing 264 are to illustrate where the multiple pixels of selection option 270B may be displayed. In one or more embodiments, the multiple pixels of selection option 270B may display effects from one or more of pseudo light sources 120A-120E. In one example, selection option 270B may include a clipping path. In another example, hashing 264 may represent a background of selection option 270B. For instance, the background of selection option 270B may display effects from one or more of pseudo light sources 120A-120E. In one or more embodiments, the effects from one or more of pseudo light sources 120A-120E may be utilized to draw attention of a user to selection option 270B. In one or more embodiments, the effects from one or more of pseudo light sources 120A-120E may be utilized to indicate that selection option 270B has been selected and/or actuated.

In one or more embodiments, utilizing effects from one or more of pseudo light sources 120A-120E may be portable from one GUI element (e.g., one GUI widget) to another GUI element (e.g., another GUI widget). In one example, utilizing effects from one or more of pseudo light sources 120A-120E may be portable from a first GUI element of GUI elements 250B, 254, 256, and 270B to a second GUI element of GUI elements 250B, 254, 256, and 270B, different from the first GUI element. In another example, utilizing effects from one or more of pseudo light sources 120A-120E may be portable from a first GUI element of GUI elements 250A, 250B, 252, 254, 256, and 270A-270E, among others, to a second GUI element of GUI elements 250A, 250B, 252, 254, 256, and 270A-270E, among others, different from the first GUI element.

Figure 3A:
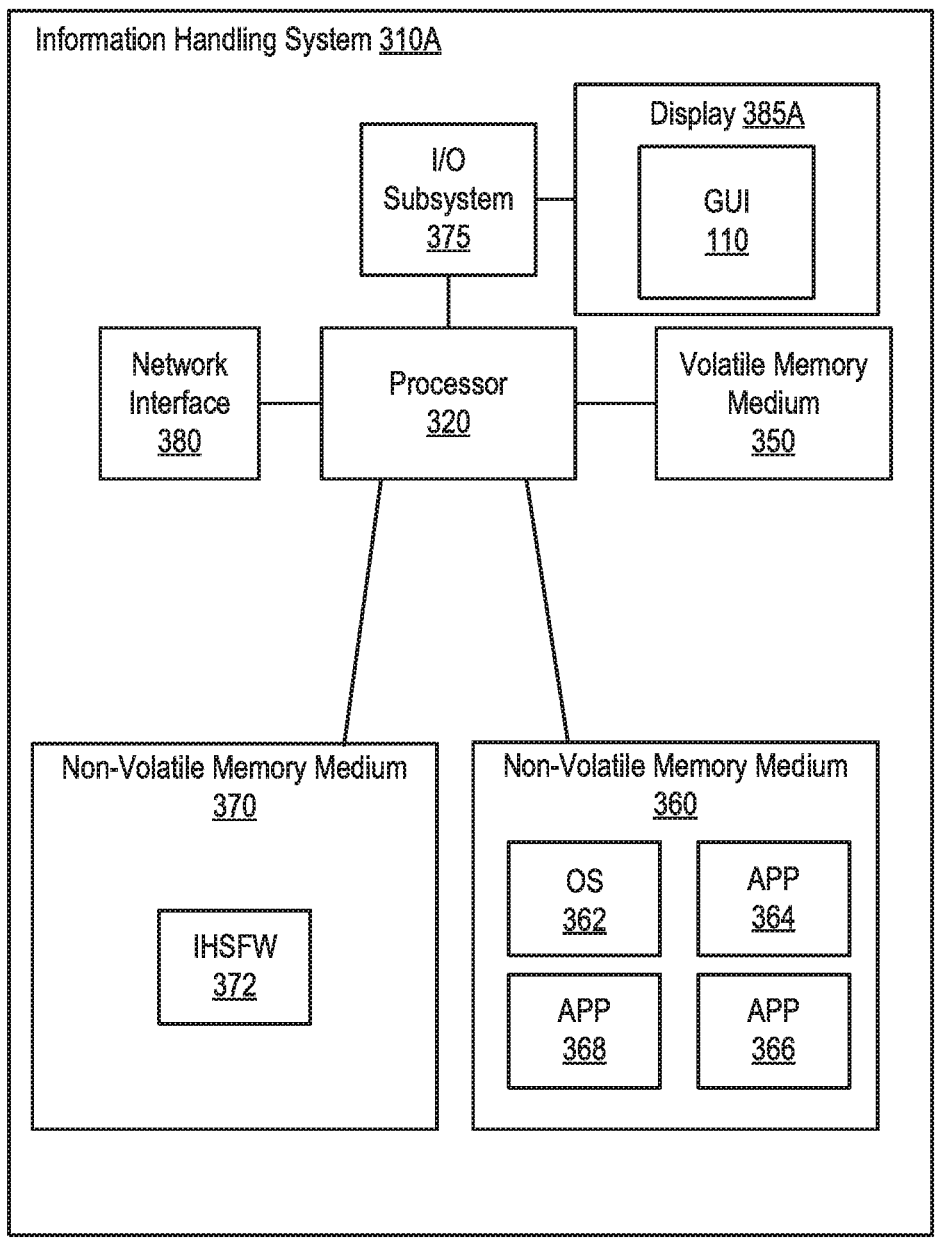
FIGS. 3A and 3B illustrate examples of information handling systems, according to one or more embodiments.
Figure 3B:
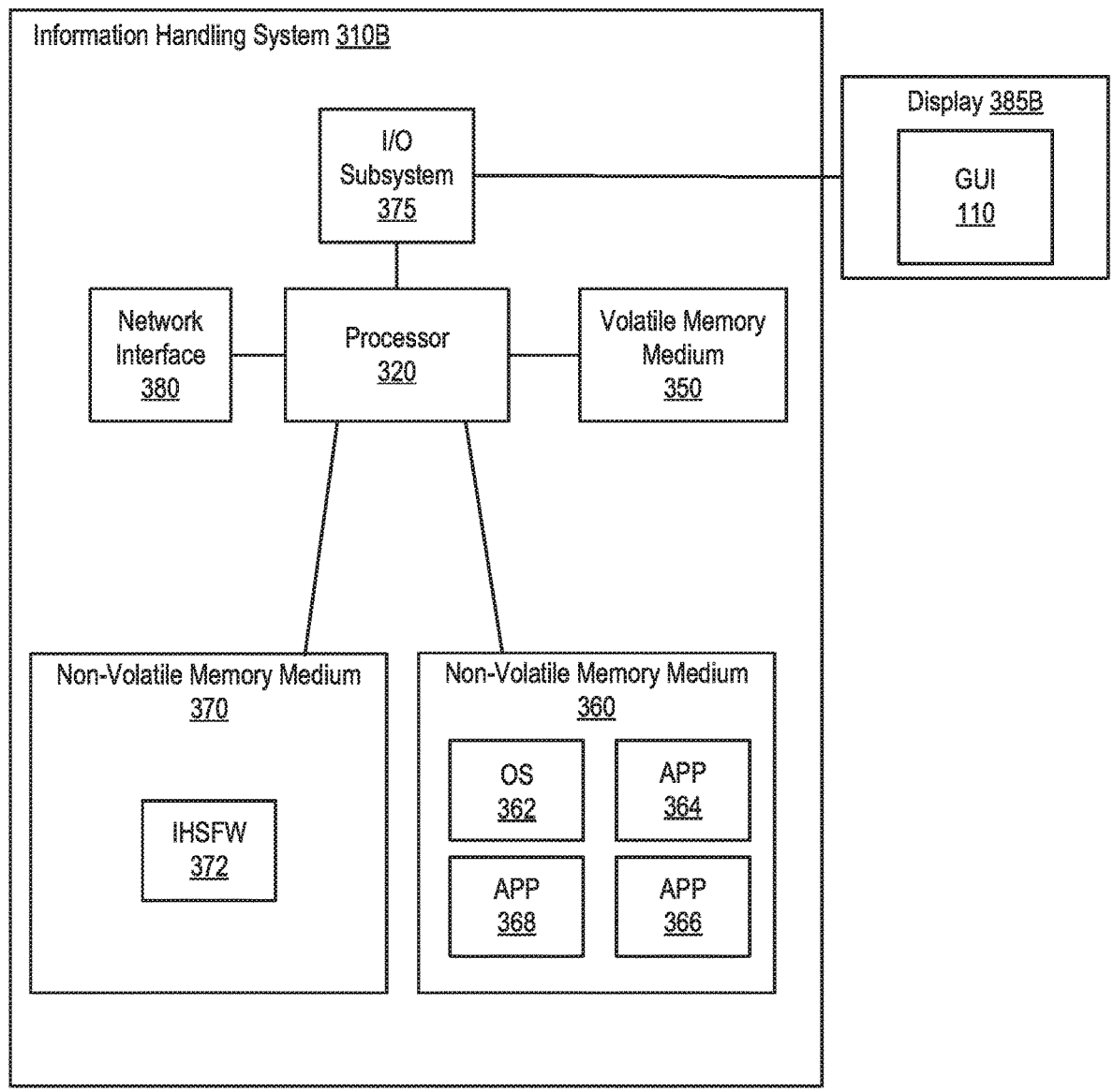

Turning now to FIGS. 3A and 3B, examples of information handling systems are illustrated, according to one or more embodiments. An information handling system (IHS) 310 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 310 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 310 may include or have a form factor of that of or similar to one or more of a laptop, a notebook, a telephone, a tablet, and a PDA, among others. For example, a portable IHS 310 may be readily carried and/or transported by a user (e.g., a person). In one or more embodiments, components of IHS 310 may include one or more storage devices, one or more communications ports for communicating with external devices as well as various input and output (I/O) devices, such as a keyboard, a mouse, and a video display, among others. In one or more embodiments, IHS 310 may include one or more buses operable to transmit communication between or among two or more hardware components. In one example, a bus of IHS 310 may include one or more of a memory bus, a peripheral bus, and a local bus, among others. In another example, a bus of IHS 310 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 310 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 310 may include a processor 320, a volatile memory medium 350, non-volatile memory media 360 and 370, an I/O subsystem 375, and a network interface 380. As illustrated, volatile memory medium 350, non-volatile memory media 360 and 370, I/O subsystem 375, and network interface 380 may be communicatively coupled to processor 320.

In one or more embodiments, one or more of volatile memory medium 350, non-volatile memory media 360 and 370, I/O subsystem 375, and network interface 380 may be communicatively coupled to processor 320 via one or more buses, one or more switches, and/or one or more root complexes, among others. In one example, one or more of volatile memory medium 350, non-volatile memory media 360 and 370, I/O subsystem 375, and network interface 380 may be communicatively coupled to processor 320 via one or more PCI-Express (PCIe) root complexes. In another example, one or more of an I/O subsystem 375 and a network interface 380 may be communicatively coupled to processor 320 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 350 may include volatile storage such as, for example, RAM, DRAM (dynamic RAM), EDO RAM (extended data out RAM), SRAM (static RAM), etc. One or more of non-volatile memory media 360 and 370 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 380 may be utilized in communicating with one or more networks and/or one or more other information handling systems. In one example, network interface 380 may enable IHS 310 to communicate via a network utilizing a suitable transmission protocol and/or standard. In a second example, network interface 380 may be coupled to a wired network. In a third example, network interface 380 may be coupled to an optical network. In another example, network interface 380 may be coupled to a wireless network.

In one or more embodiments, network interface 380 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 320 may execute processor instructions in implementing one or more systems, one or more flowcharts, one or more methods, and/or one or more processes described herein. In one example, processor 320 may execute processor instructions from one or more of memory media 350-370 in implementing one or more systems, one or more flowcharts, one or more methods, and/or one or more processes described herein. In another example, processor 320 may execute processor instructions via network interface 380 in implementing one or more systems, one or more flowcharts, one or more methods, and/or one or more processes described herein.

In one or more embodiments, processor 320 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 320 may interpret and/or execute program instructions and/or process data stored locally (e.g., via memory media 350-370 and/or another component of IHS 310). In another example, processor 320 may interpret and/or execute program instructions and/or process data stored remotely (e.g., via a network storage resource).

In one or more embodiments, I/O subsystem 375 may represent a variety of communication interfaces, graphics interfaces, video interfaces, user input interfaces, and/or peripheral interfaces, among others. For example, I/O subsystem 375 may include one or more of a touch panel and a display adapter, among others. For instance, a touch panel may include circuitry that enables touch functionality in conjunction with a display that is driven by a display adapter.

As shown, non-volatile memory medium 360 may include an operating system (OS) 362, and applications (APPs) 364-368. In one or more embodiments, one or more of OS 362 and APPs 364-368 may include processor instructions executable by processor 320. In one example, processor 320 may execute processor instructions of one or more of OS 362 and APPs 364-368 via non-volatile memory medium 360. In another example, one or more portions of the processor instructions of the one or more of OS 362 and APPs 364-368 may be transferred to volatile memory medium 350, and processor 320 may execute the one or more portions of the processor instructions of the one or more of OS 362 and APPs 364-368 via volatile memory medium 350.

As illustrated, non-volatile memory medium 370 may include information handling system firmware (IHSFW) 372. In one or more embodiments, IHSFW 372 may include processor instructions executable by processor 320. For example, IHSFW 372 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 320 may execute processor instructions of IHSFW 372 via non-volatile memory medium 370. In another instance, one or more portions of the processor instructions of IHSFW 372 may be transferred to volatile memory medium 350, and processor 320 may execute the one or more portions of the processor instructions of IHSFW 372 via volatile memory medium 350.

In one or more embodiments, processor 320 and one or more components of IHS 310 may be included in a system-on-chip (SoC). For example, the SoC may include processor 320 and a platform controller hub (not specifically illustrated).

As shown in FIG. 3A, an IHS 310A may include a display 385A, which may be coupled to I/O subsystem 375. In one or more embodiments, display 385A may display GUI 110. As illustrated in FIG. 3B, a display 385B may be external to an IHS 310B, which may be coupled to IHS 310B via I/O subsystem 375. In one or more embodiments, display 385B may display GUI 110.

Figure 4:
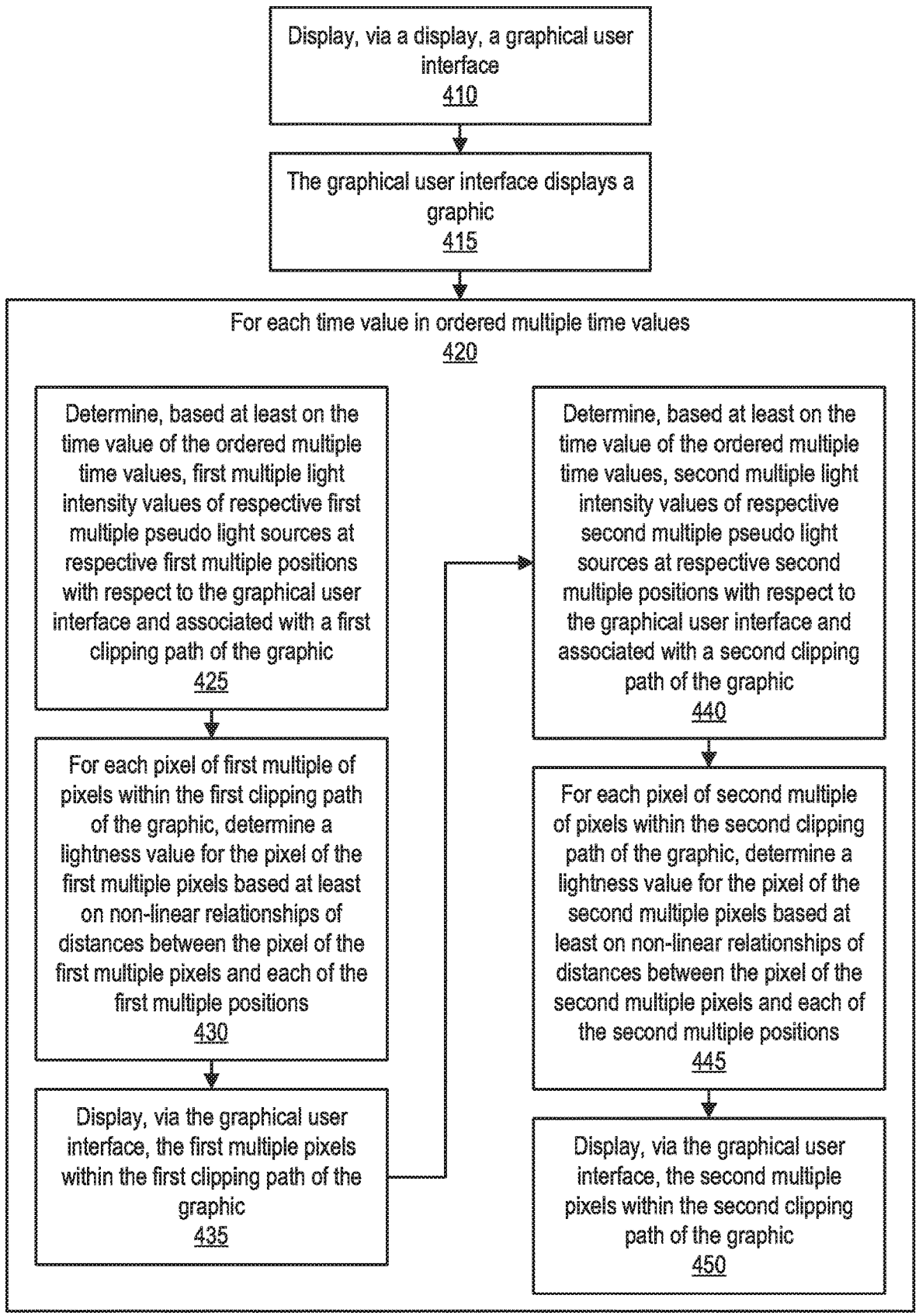
FIG. 4 illustrates an example of a method, according to one or more embodiments.

Turning now to FIG. 4, an example of a method is illustrated, according to one or more embodiments. At 410, a display may display a graphical user interface. For example, display 385 may display GUI 110. At 415, the graphical user interface may display a graphic. For example, GUI 110 may display graphic 210. At 420, method elements 420-450 may be performed for each time value in ordered multiple time values. For example, the ordered multiple time values may be or include $t_1, t_2, \ldots, t_N$. In one or more embodiments, method elements 420-450 may be repeated for each time value in ordered multiple time values. For example, method elements 420-450 may be repeated for each of $t_1, t_2, \ldots, t_N$.

At 425, first multiple light intensity values of respective first multiple pseudo light sources at respective first multiple positions with respect to the graphical user interface and associated with a first clipping path of the graphic may be determined based at least on the time value of the ordered multiple time values. In one or more embodiments, $I_{PLS}(t)$ for a pseudo light source (PLS) may be determined. In one or more embodiments, a first $I_{PLS}(t)$ for a first pseudo light source may be different from a second $I_{PLS}(t)$ for a second pseudo light source. In one or more embodiments, a first pseudo light source may share an $I_{PLS}(t)$ with a second pseudo light source. In one or more embodiments, an $I_{PLS}(t)$ may be or include a mapping. In one example, an $I_{PLS}(t)$ may be or include a discrete mapping. In one instance, the discrete mapping may be or include a discrete mathematical function. In another instance, the discrete mapping may be or include a table (e.g., a lookup table). In another example, an $I_{PLS}(t)$ may be or include a continuous mapping. For instance, the continuous mapping may be or include a continuous mathematical function.

At 430, for each pixel of first multiple of pixels within the first clipping path of the graphic, a lightness value for the pixel of the first multiple pixels may be determined based at least on non-linear relationships of distances between the pixel of the first multiple pixels and each of the first multiple positions. For example, the first clipping path may be or include clipping path 220.

In one or more embodiments, a lightness value of the pixel of the first multiple pixels may be determined via $$\sum_{i=0}^{M} LightnessValue(I_{PLS}(t), \vec{p}, \vec{s_i},$$

where $\vec{p}$ is the position of the pixel and $\vec{s_i}$ is the position of the ith pseudo light source, where $$LightnessValue(I_{PLS}(t), \vec{p}, \vec{s}) = \frac{I_{PLS}(t)}{(distance(\vec{p}, \vec{s}))^2} = \frac{I_{PLS}(t)}{(p_x - s_x)^2 + (p_y - s_y)^2},$$

where $\vec{p}$ is the position of the pixel and $\vec{s}$ is the position of the pseudo light source. For instance, M may be a number of the first multiple pseudo light sources.

In one or more embodiments, LightnessValue($I_{PLS}(t), \vec{p}, \vec{s}$) may be or include an inverse square relationship with distance($\vec{p}, \vec{s}$). For example, LightnessValue($I_{PLS}(t), \vec{p}, \vec{s}$) may provide one or more values based at least on $$\frac{1}{(distance(\vec{p}, \vec{s}))^2}.$$

In one or more embodiments, for each pixel of the multiple of pixels within the first clipping path of the graphic, a color for the pixel of the first multiple pixels may be determined based at least on respective colors of the first multiple pseudo light sources. For example, the color for the pixel of the first multiple pixels may be determined via blending the respective colors of the first multiple pseudo light sources. In one instance, blending the respective colors of the first multiple pseudo light sources may include adding or summing the respective colors of the first multiple pseudo light sources. In another instance, blending the respective colors of the first multiple pseudo light sources may include averaging each of the red, green, and blue values of the respective colors of the first multiple pseudo light sources.

At 435, the first multiple pixels within the first clipping path of the graphic may be displayed via the graphical user interface. For example, the first multiple pixels may be displayed via hashing 230. For instance, while hashing 230 illustrates stripes, displaying the first multiple pixels may not include displaying stripes, banding, and/or a Moire pattern. The stripes of hashing 230 are to illustrated a portion of graphic 210 where the first multiple pixels may be displayed.

At 440, second multiple light intensity values of respective second multiple pseudo light sources at respective second multiple positions with respect to the graphical user interface and associated with a second clipping path of the graphic may be determined based at least on the time value of the ordered multiple time values.

In one or more embodiments, $I_{PLS}(t)$ for a pseudo light source (PLS) may be determined. In one or more embodiments, a first $I_{PLS}(t)$ for a first pseudo light source may be different from a second $I_{PLS}(t)$ for a second pseudo light source. In one or more embodiments, a first pseudo light source may share an $I_{PLS}(t)$ with a second pseudo light source. In one or more embodiments, an $I_{PLS}(t)$ may be or include a mapping. In one example, an $I_{PLS}(t)$ may be or include a discrete mapping. In one instance, the discrete mapping may be or include a discrete mathematical function. In another instance, the discrete mapping may be or include a table (e.g., a lookup table). In another example, an $I_{PLS}(t)$ may be or include a continuous mapping. For instance, the continuous mapping may be or include a continuous mathematical function.

At 445, for each pixel of second multiple of pixels within the second clipping path of the graphic, a lightness value for the pixel of the second multiple pixels may be determined based at least on non-linear relationships of distances between the pixel of the second multiple pixels and each of the second multiple positions. For example, the second clipping path may be or include clipping path 222.

In one or more embodiments, a lightness value of the pixel of the second multiple pixels may be determined via $$\sum_{i=1}^{Q} LightnessValue(I_{PLS}(t), \vec{p}, \vec{s_i}),$$

where $\vec{p}$ is the position of the pixel and $\vec{s_i}$ is the position of the ith pseudo light source, where $$LightnessValue(I_{PLS}(t), \vec{p}, \vec{s}) = \frac{I_{PLS}(t)}{(distance(\vec{p}, \vec{s}))^2} = \frac{I_{PLS}(t)}{(p_x - s_x)^2 + (p_y - s_y)^2},$$

where $\vec{p}$ is the position of the pixel and $\vec{s}$ is the position of the pseudo light source. For instance, Q may be a number of the second multiple pseudo light sources.

In one or more embodiments, LightnessValue($I_{PLS}(t)$, $\vec{p}$, $\vec{s}$) may be or include an inverse square relationship with distance($\vec{p}$, $\vec{s}$). For example, LightnessValue($I_{PLS}(t)$, $\vec{p}$, $\vec{s}$) may provide one or more values based at least on $$\frac{1}{(\text{distance}(\vec{p}, \vec{s}))^2}.$$

In one or more embodiments, for each pixel of the multiple of pixels within the second clipping path of the graphic, a color for the pixel of the second multiple pixels may be determined based at least on respective colors of the second multiple pseudo light sources. For example, the color for the pixel of the second multiple pixels may be determined via blending the respective colors of the second multiple pseudo light sources. In one instance, blending the respective colors of the second multiple pseudo light sources may include adding or summing the respective colors of the second multiple pseudo light sources. In another instance, blending the respective colors of the second multiple pseudo light sources may include averaging each of the red, green, and blue values of the respective colors of the second multiple pseudo light sources.

At 450, the second multiple pixels within the second clipping path of the graphic may be displayed via the graphical user interface. For example, the second multiple pixels may be displayed via hashing 232. For instance, while hashing 232 illustrates stripes, displaying the second multiple pixels may not include displaying stripes, banding, and/or a Moire pattern. The stripes of hashing 232 are to illustrated a portion of graphic 210 where the second multiple pixels may be displayed.

In one or more embodiments, third multiple pixels may be displayed via hashing 234. For example, hashing 234 may represent a background of GUI 110. For instance, while hashing 234 illustrates stripes, displaying the third multiple pixels may not include displaying stripes, banding, and/or a Moire pattern. The stripes of hashing 234 are to illustrated a portion of graphic 210 where the third multiple pixels may be displayed.

In one or more embodiments, method element 420 may be performed multiple times. For example, method element 420 may be looped via looping the ordered multiple time values. In one instance, method element 420 may be looped via looping $t_1, t_2, \ldots, t_N; t_1, t_2, \ldots, t_N; t_1, t_2, \ldots, t_N$; etc. In another instance, method element 420 may be looped via looping $t_1, t_2, \ldots, t_N, t_N, t_{N-1}, \ldots t_2, t_1; t_1, t_2, \ldots, t_N; t_N, t_N, t_{N-1}, \ldots t_2, t_1$; etc.

In one or more embodiments, an effect of motion may be provided via performing method elements 420-450 for each time value in ordered multiple time values. In one example, a portion of a graphic may appear to move via performing method elements 420-450 for each time value in ordered multiple time values. In one instance, a portion of graphic 210 within clipping path 220 may appear to move. In another instance, a portion of graphic 210 within clipping path 222 may appear to move. In another example, a background of graphic may appear to move.

In one or more embodiments, a location of a pseudo light source may be random. In one example, a location of a pseudo light source may be chosen at random approximately to a time when GUI 110 is displayed. In another example, a location of a pseudo light source may be chosen at random approximately to a time when graphic 210 is displayed. In one or more embodiments, a location of a pseudo light source may be retrieved. For example, a location of a pseudo light source may be retrieved from a memory medium. For instance, a memory medium may store a location of a pseudo light source. In one or more embodiments, a location of a pseudo light source may be stored in association with a stored graphic. For example, a storage object may include a graphic and one or more locations of one or more respective pseudo light sources.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium, coupled to the at least one processor, that stores instructions executable by the at least one processor, which when executed by the at least one processor, cause the information handling system to:
   display, via a display, a graphical user interface;
   display, via the graphical user interface, a graphic; and
   for each time value in an ordered plurality of time values:
      determine, based at least on the time value of the ordered plurality of time values, a first plurality of light intensity values of a respective first plurality of pseudo light sources at a respective first plurality of positions with respect to the graphical user interface and associated with a first clipping path of the graphic;
      for each pixel of a first plurality of pixels within the first clipping path of the graphic, determine a lightness value for the pixel of the first plurality of pixels based at least on non-linear relationships of distances between the pixel of the first plurality of pixels and each of the first plurality of positions;
      display, via the graphical user interface, the first plurality of pixels within the first clipping path of the graphic;
      determine, based at least on the time value of the ordered plurality of time values, a second plurality of light intensity values of a second first plurality of pseudo light sources at a respective second plurality of positions with respect to the graphical user interface and associated with a second clipping path of the graphic;
for each pixel of a second plurality of pixels within the second clipping path of the graphic, determine a lightness value for the pixel of the second plurality of pixels based at least on non-linear relationships of distances between the pixel of the second plurality of pixels and each of the second plurality of positions; and
display, via the graphical user interface, the second plurality of pixels within the second clipping path of the graphic.

2. The information handling system of claim 1, wherein the first plurality of pseudo light sources are associated with a respective plurality of different colors.

3. The information handling system of claim 1, wherein the first plurality of pseudo light sources includes at least one pseudo light source of the second plurality of pseudo light sources.

4. The information handling system of claim 1, wherein the instructions further cause the information handling system to:
display, via the graphical user interface, a background graphic; and
for each time value in the ordered plurality of time values:
determine, based at least on the time value of the ordered plurality of time values, a third plurality of light intensity values of a respective third plurality of pseudo light sources at a respective third plurality of positions with respect to the graphical user interface and associated with the background graphic;
for each pixel of a third plurality of pixels of the background graphic, determine a lightness value for the pixel of the third plurality of pixels based at least on non-linear relationships of distances between the pixel of the third plurality of pixels and each of the third plurality of positions; and
display, via the graphical user interface, the third plurality of pixels of the background graphic.

5. The information handling system of claim 1, wherein the graphic includes at least one portion that is static.

6. The information handling system of claim 1,
wherein at least a first two or more of the first plurality of pixels are at a first distance from a first pseudo light source of the plurality of first pseudo light sources and are associated with a hue value, a saturation value, and a first lightness value;
wherein at least a second two or more of the first plurality of pixels are at a second distance from the first pseudo light source of the plurality of first pseudo light sources and are associated with the hue value, the saturation value, and a second lightness value;
wherein the second distance is greater than the first distance; and
wherein the second lightness value is less than the first lightness value.

7. The information handling system of claim 1,
wherein the non-linear relationships of distances between the pixel of the first plurality of pixels and each of the first plurality of positions is based at least on an inverse square relationship.

8. A method, comprising:
displaying, via a display, a graphical user interface;
the graphical user interface displaying a graphic; and
for each time value in an ordered plurality of time values:
determining, based at least on the time value of the ordered plurality of time values, a first plurality of light intensity values of a respective first plurality of pseudo light sources at a respective first plurality of positions with respect to the graphical user interface and associated with a first clipping path of the graphic;
for each pixel of a first plurality of pixels within the first clipping path of the graphic, determining a lightness value for the pixel of the first plurality of pixels based at least on non-linear relationships of distances between the pixel of the first plurality of pixels and each of the first plurality of positions;
displaying, via the graphical user interface, the first plurality of pixels within the first clipping path of the graphic;
determining, based at least on the time value of the ordered plurality of time values, a second plurality of light intensity values of a second first plurality of pseudo light sources at a respective second plurality of positions with respect to the graphical user interface and associated with a second clipping path of the graphic;
for each pixel of a second plurality of pixels within the second clipping path of the graphic, determining a lightness value for the pixel of the second plurality of pixels based at least on non-linear relationships of distances between the pixel of the second plurality of pixels and each of the second plurality of positions; and
displaying, via the graphical user interface, the second plurality of pixels within the second clipping path of the graphic.

9. The method of claim 8, wherein the first plurality of pseudo light sources are associated with a respective plurality of different colors.

10. The method of claim 8, further comprising:
the graphical user interface displaying a background graphic; and
for each time value in the ordered plurality of time values:
determining, based at least on the time value of the ordered plurality of time values, a third plurality of light intensity values of a respective third plurality of pseudo light sources at a respective third plurality of positions with respect to the graphical user interface and associated with the background graphic;
for each pixel of a third plurality of pixels of the background graphic, determining a lightness value for the pixel of the third plurality of pixels based at least on non-linear relationships of distances between the pixel of the third plurality of pixels and each of the third plurality of positions; and
displaying, via the graphical user interface, the third plurality of pixels of the background graphic.

11. The method of claim 8, wherein the graphic includes at least one portion that is static.

12. The method of claim 8,
wherein at least a first two or more of the first plurality of pixels are at a first distance from a first pseudo light source of the first plurality of pseudo light sources and are associated with a hue value, a saturation value, and a first lightness value;
wherein at least a second two or more of the first plurality of pixels are at a second distance from the first pseudo light source of the first plurality of pseudo light sources and are associated with the hue value, the saturation value, and a second lightness value;

wherein the second distance is greater than the first distance; and wherein the second lightness value is less than the first lightness value.

13. The method of claim 8, wherein the non-linear relationships of distances between the pixel of the first plurality of pixels and each of the first plurality of positions is based at least on an inverse square relationship.

14. A computer-readable non-transitory memory medium that includes instructions that, when executed by at least one processor of an information handling system, cause the information handling system to:

display, via a display, a graphical user interface;

display, via the graphical user interface, a graphic; and for each time value in an ordered plurality of time values:

determine, based at least on the time value of the ordered plurality of time values, a first plurality of light intensity values of a respective first plurality of pseudo light sources at a respective first plurality of positions with respect to the graphical user interface and associated with a first clipping path of the graphic;

for each pixel of a first plurality of pixels within the first clipping path of the graphic, determine a lightness value for the pixel of the first plurality of pixels based at least on non-linear relationships of distances between the pixel of the first plurality of pixels and each of the first plurality of positions;

display, via the graphical user interface, the first plurality of pixels within the first clipping path of the graphic;

determine, based at least on the time value of the ordered plurality of time values, a second plurality of light intensity values of a second first plurality of pseudo light sources at a respective second plurality of positions with respect to the graphical user interface and associated with a second clipping path of the graphic;

for each pixel of a second plurality of pixels within the second clipping path of the graphic, determine a lightness value for the pixel of the second plurality of pixels based at least on non-linear relationships of distances between the pixel of the second plurality of pixels and each of the second plurality of positions; and display, via the graphical user interface, the second plurality of pixels within the second clipping path of the graphic.

15. The computer-readable non-transitory memory medium of claim 14, wherein the first plurality pseudo light sources are associated with a respective plurality of different colors.

16. The computer-readable non-transitory memory medium of claim 14, wherein the first plurality of pseudo light sources includes at least one pseudo light source of the second plurality of pseudo light sources.

17. The computer-readable non-transitory memory medium of claim 14, wherein the instructions further cause the information handling system to:

display, via the graphical user interface, a background graphic; and for each time value in the ordered plurality of time values:

determine, based at least on the time value of the ordered plurality of time values, a third plurality of light intensity values of a respective third plurality of pseudo light sources at a respective third plurality of positions with respect to the graphical user interface and associated with the background graphic;

for each pixel of a third plurality of pixels of the background graphic, determine a lightness value for the pixel of the third plurality of pixels based at least on non-linear relationships of distances between the pixel of the third plurality of pixels and each of the third plurality of positions; and display, via the graphical user interface, the third plurality of pixels of the background graphic.

18. The computer-readable non-transitory memory medium of claim 14, wherein the graphic includes at least one portion that is static.

19. The computer-readable non-transitory memory medium of claim 14, wherein at least a first two or more of the first plurality of pixels are at a first distance from a first pseudo light source of the plurality of first pseudo light sources and are associated with a hue value, a saturation value, and a first lightness value;

wherein at least a second two or more of the first plurality of pixels are at a second distance from the first pseudo light source of the plurality of first pseudo light sources and are associated with the hue value, the saturation value, and a second lightness value;

wherein the second distance is greater than the first distance; and wherein the second lightness value is less than the first lightness value.

\* \* \* \* \*